Figure 5:
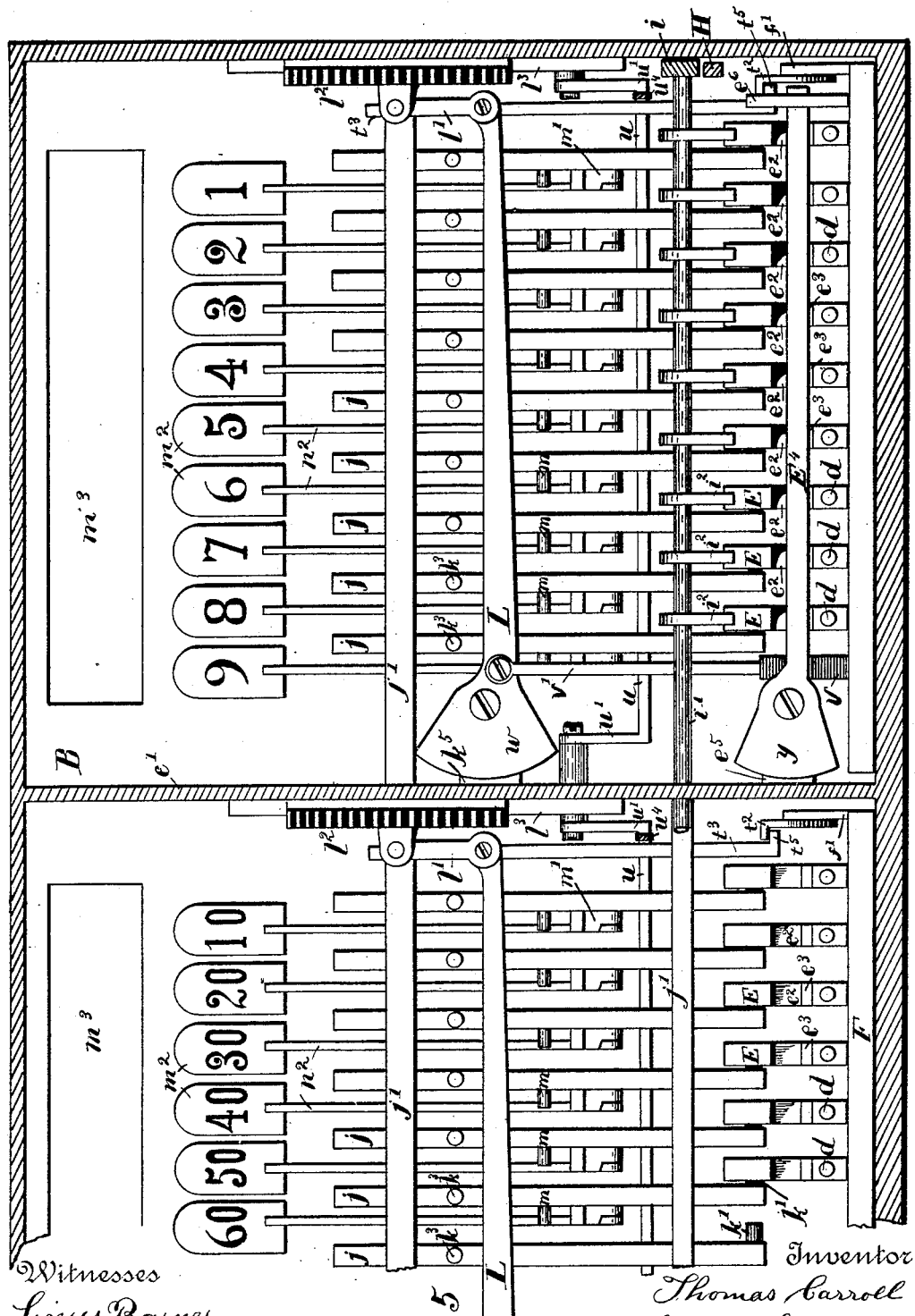

(No Model.) 8 Sheets—Sheet 1.
T. CARROLL.
TOTAL ADDING CASH REGISTER.
No. 521,333. Patented June 12, 1894.
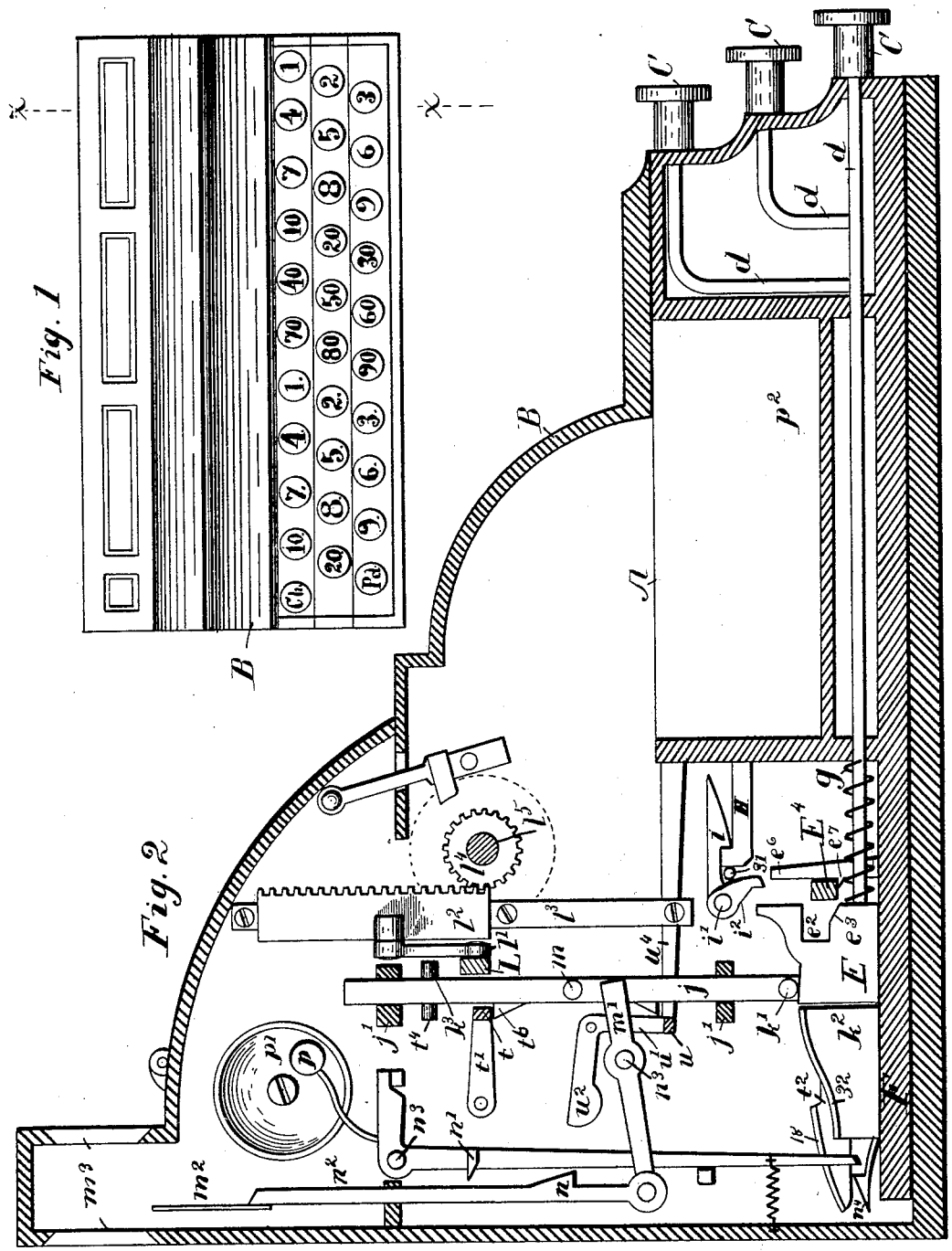
Witnesses
Linus Barnes
George Webber
Inventor
Thomas Carroll
By George L. Barnes
Attorney (No Model.) 8 Sheets—Sheet 2.
T. CARROLL.
TOTAL ADDING CASH REGISTER.
No. 521,333. Patented June 12, 1894.
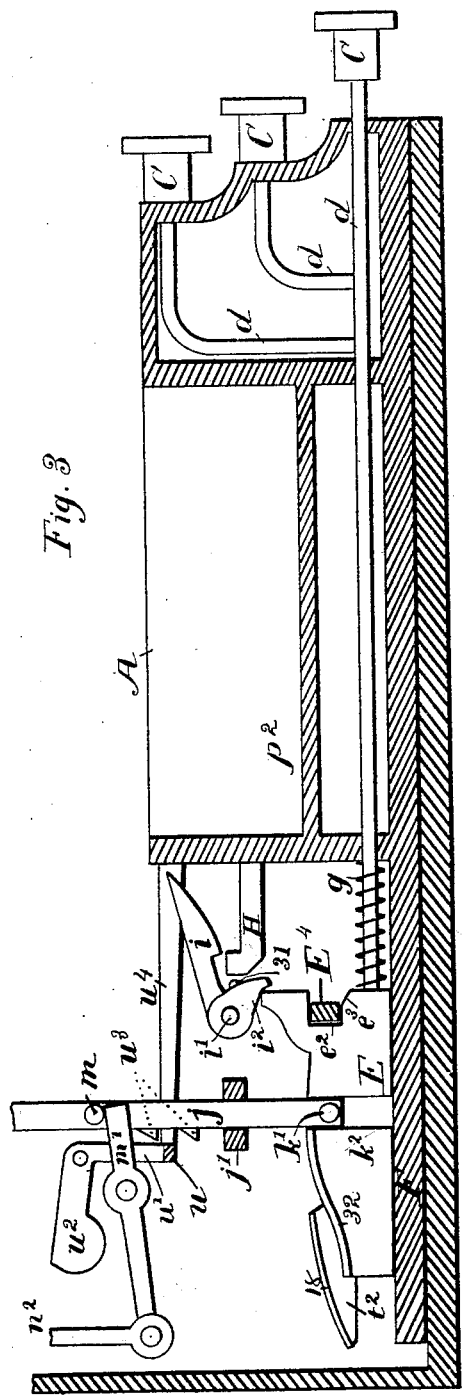
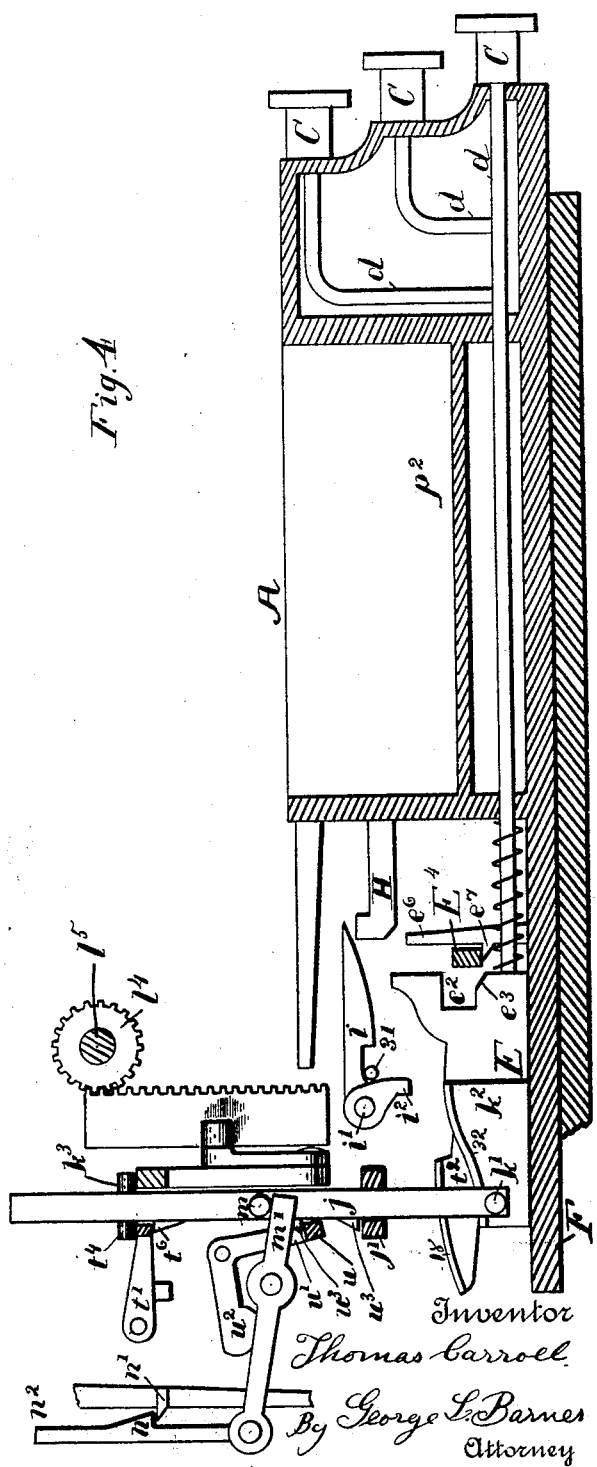
Witnesses
Linus Barnes
George Webber
Inventor
Thomas Carroll
By George L. Barnes
Attorney (No Model.) T. CARROLL. 8 Sheets—Sheet 3.
TOTAL ADDING CASH REGISTER.
No. 521,333. Patented June 12, 1894.

Witnesses
Linus Barnes
George Webber

Inventor
Thomas Carroll
By George L. Barnes
Attorney (No Model.)  8 Sheets—Sheet 4.

T. CARROLL.
TOTAL ADDING CASH REGISTER.

No. 521,333. Patented June 12, 1894.

Witnesses
Linus Barnes
George Webber

Inventor
Thomas Carroll
By George L. Barnes Attorney

THE NATIONAL LITHOGRAPHING COMPANY,
WASHINGTON, D. C.

(No Model.) 8 Sheets—Sheet 5.
T. CARROLL.
TOTAL ADDING CASH REGISTER.
No. 521,333. Patented June 12, 1894.
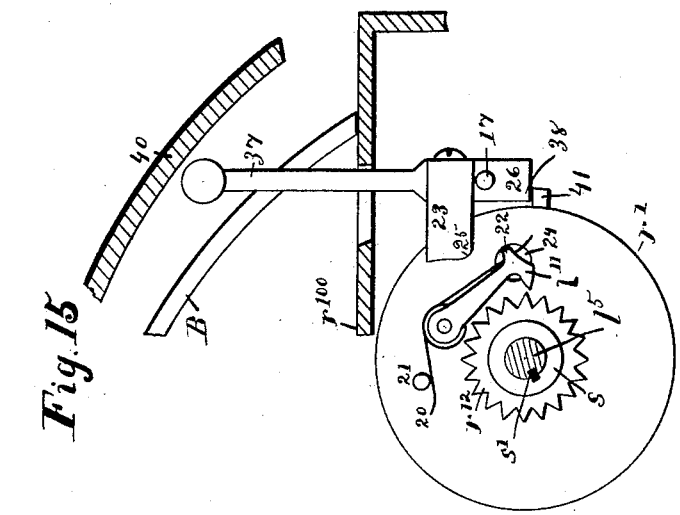
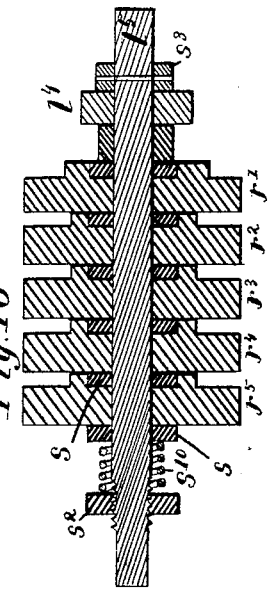
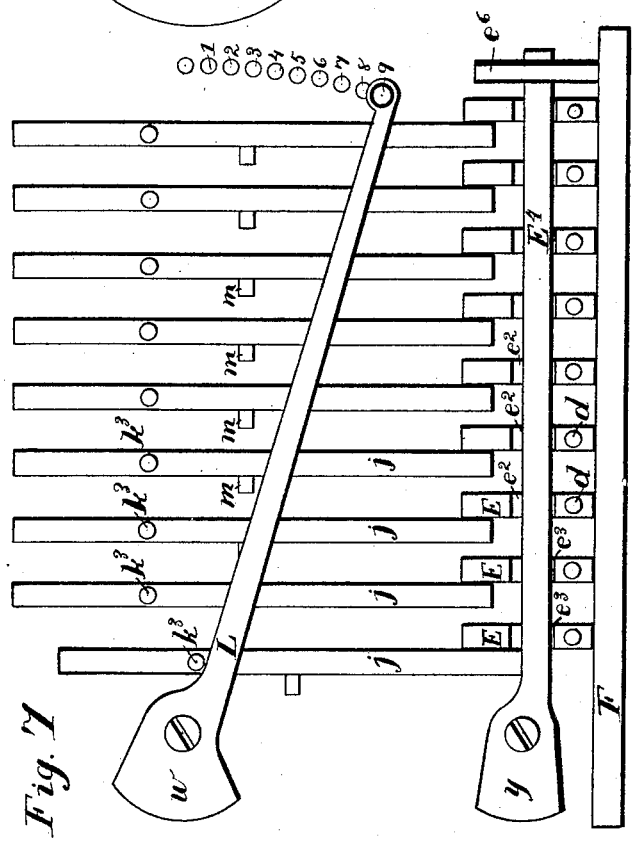
Witnesses
Linus Barnes
George Webber
Inventor
Thomas Carroll
By George L. Barnes
Attorney (No Model.)
T. CARROLL.
TOTAL ADDING CASH REGISTER.
No. 521,333. Patented June 12, 1894.
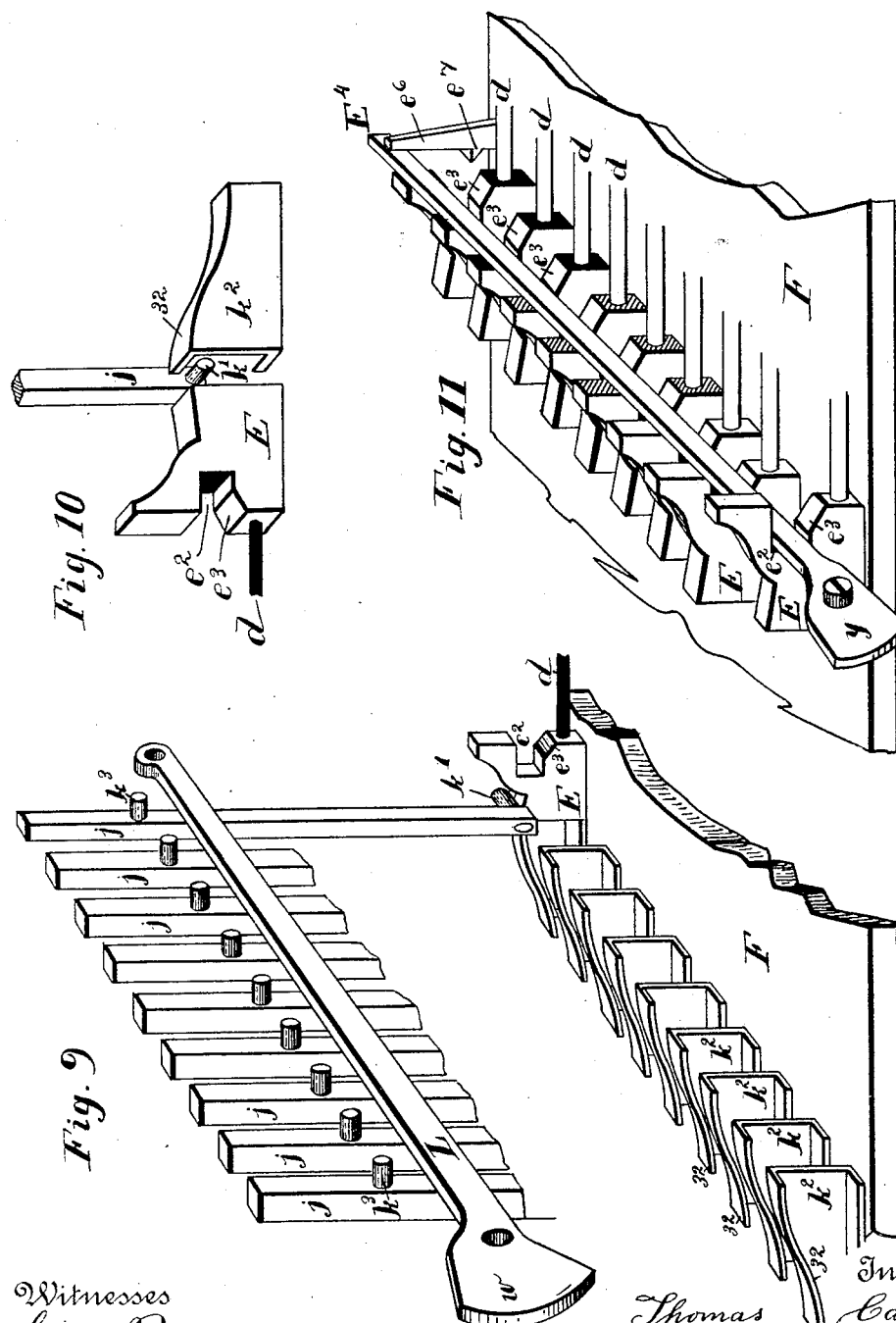
Witnesses
Linus Barnes
George Webber
Inventor
Thomas Carroll
By George L. Barnes Attorney

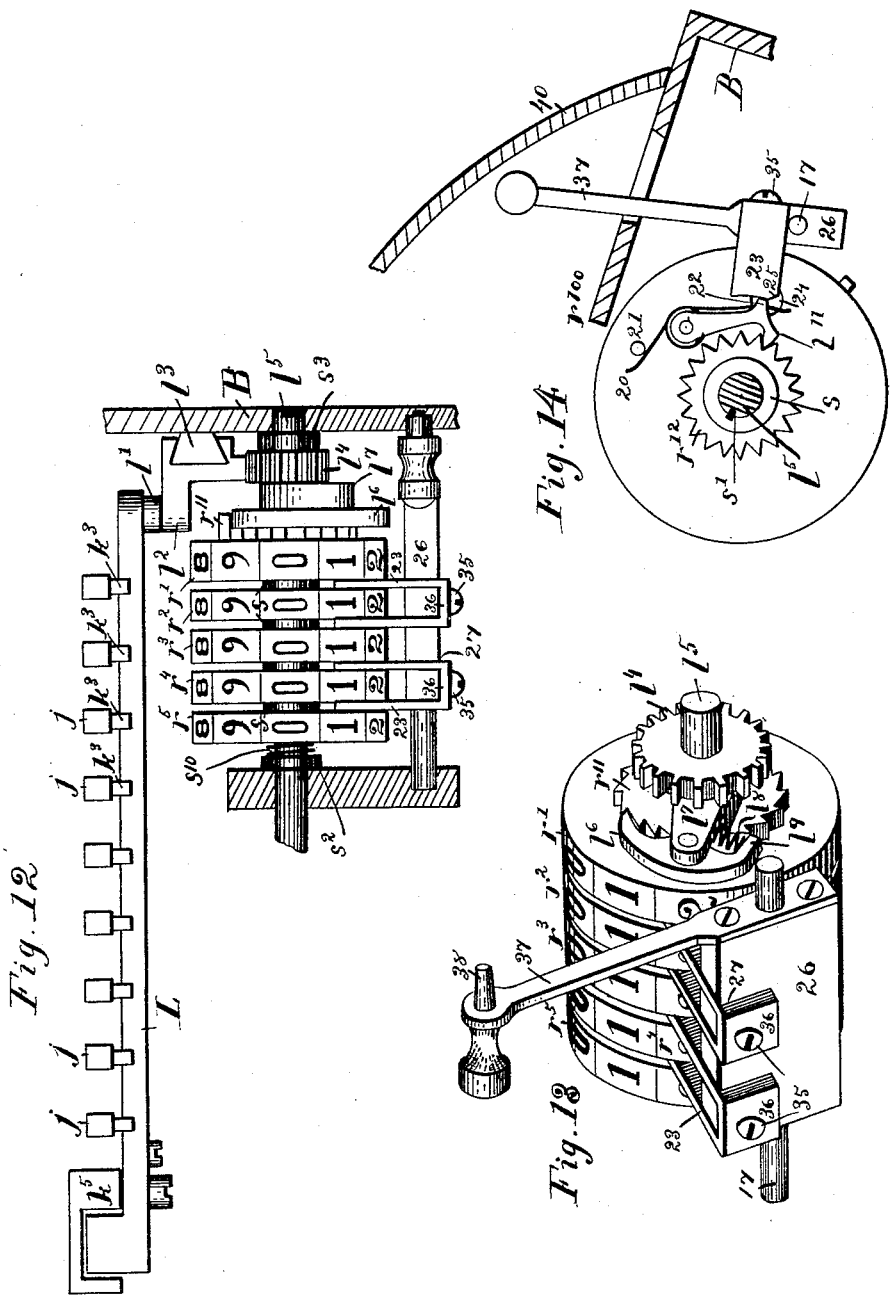

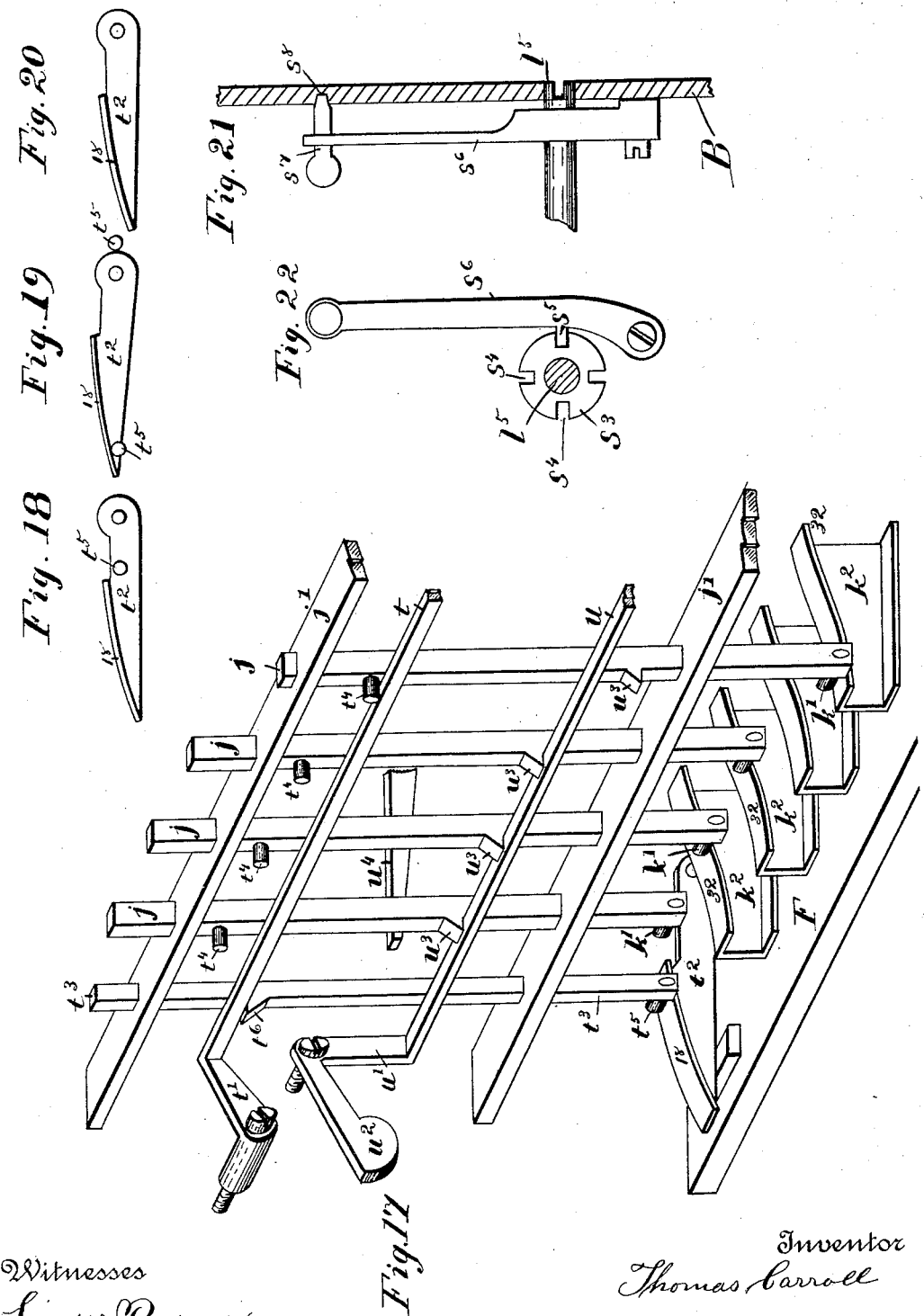

United States Patent Office.

THOMAS CARROLL, OF NEW HAVEN, CONNECTICUT, ASSIGNOR TO THE HUBINGER CARROLL CASH REGISTER COMPANY, OF SAME PLACE.

TOTAL-ADDING CASH-REGISTER.

SPECIFICATION forming part of Letters Patent No. 521,333, dated June 12, 1894.

Application filed August 21, 1893. Serial No. 483,634. (No model.)

*To all whom it may concern:*

Be it known that I, THOMAS CARROLL, a citizen of the United States, residing at New Haven, in the county of New Haven and State of Connecticut, have invented certain new and useful Improvements in Total-Adding Cash-Registers, of which the following is a specification.

My invention relates to a total or sectional adding cash register and indicator, and comprises certain improvements in the cash register and indicator patented to me June 6, 1893, and numbered 499,192. In the invention disclosed in the Letters Patent referred to, a series of handles, knobs or drawer pulls exteriorly mounted on the cash drawer and having operating connections or rods individually guided and adapted to a limited independent travel therein, were arranged in combination with a corresponding series of cams or motive devices carried on the drawer, and trip mechanism adapted by the initial movement of the drawer pulls to switch or operatively connect the motive mechanism of the drawer with suitable registering and indicating mechanism also corresponding to the series of drawer pulls, whereby the act of drawing open the cash drawer by means of one or more drawer pulls, accomplished the announcement, registration and indication of sales, as fully described in the said Letters Patent. In said invention the aggregate sum of the sales for any given period was obtained by adding the collective amounts individually recorded by the several registering mechanisms, the machines of this class being known as "detail adders," in distinction from machines that mechanically add the sales, and which are called "total adders."

It is the object of my present invention to provide a cash register, in which the registration of a series of drawer pulls shall be totalized or aggregated in denominational readings, that is, having each denominational series of drawer pulls or series advancing by a uniform or common difference, adapted to register collectively and by means of a single registering apparatus, whereby the amount of the sales recorded by manipulation of a uniform set or series of drawer pulls will be added in a single sum. For instance, in a cash register having a series of drawer pulls representing a series of values in arithmetical progression, as 5, 10, 15, 20, 25, and so on, advancing by five, or any other common difference, the registration corresponding to the respective drawer pulls would be aggregated in a single reading, and the machine would be a "total adder." But in a cash register adapted to register sales of any amount from one up to nine hundred and ninety nine inclusive, which will involve the use of a series of nine knobs or drawer pulls respectively representing the units one to nine inclusive, another series of nine drawer pulls representing tens from ten to ninety inclusive, and a third series of drawer pulls representing hundreds from one hundred to nine hundred inclusive, a separate registering mechanism and reading will be required for each series or denominational set of drawer pulls, thus comprising a "sectional adder," the several readings of which may be totalized by calculation.

A further object is to improve certain operative details of the mechanism, as hereinafter described.

The invention consists in the novel combination and arrangement with the movable drawer pulls, trips, and the motive mechanism carried by the drawer, of a registering device for each denominational set or series of drawer pulls, and corresponding levers or multiplying devices adapted to operate the registering mechanism in conformity with or proportionately to the representative values of the respective drawer pulls of the series, whereby the action of opening the cash drawer shall accomplish the advance of the registering mechanism through spaces corresponding to the number or value of the particular drawer pull manipulated, as for instance, opening the drawer by means of the ninth drawer pull of a series shall turn the registering wheel nine times as far as it is moved when the drawer is opened by the first drawer pull of the series.

The invention also resides in the novel mechanism for preventing the manipulation of more than one drawer pull in each series at each registering operation of the cash drawer, and a further improvement consists in the novel means for operating and resetting the registering mechanism, and in the construction of parts as hereinafter more fully described and claimed.

The improvement in the operative details of the machine consists in the means for insuring the initial lifting of the trips preparatory to their final elevation to normal position, by the motive mechanism of the trips, whereby the use of springs is dispensed with, which, in the construction described in the patent referred to, involved great resistance to the opening movement of the drawer, and caused violent jumping of the trips in the reactionary effort of the springs.

An important improvement of detail also resides in the novel means for retaining the trips in their elevated position after the withdrawal of the operating cams, whereby the fall of the entire series of trips at each movement of the drawer, and the necessity of collectively elevating them on the return or closing movement of the drawer is effectually avoided, as hereinafter more fully described and claimed.

Figure 8:
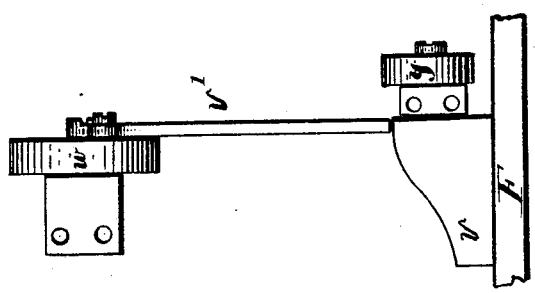
Figure 6:
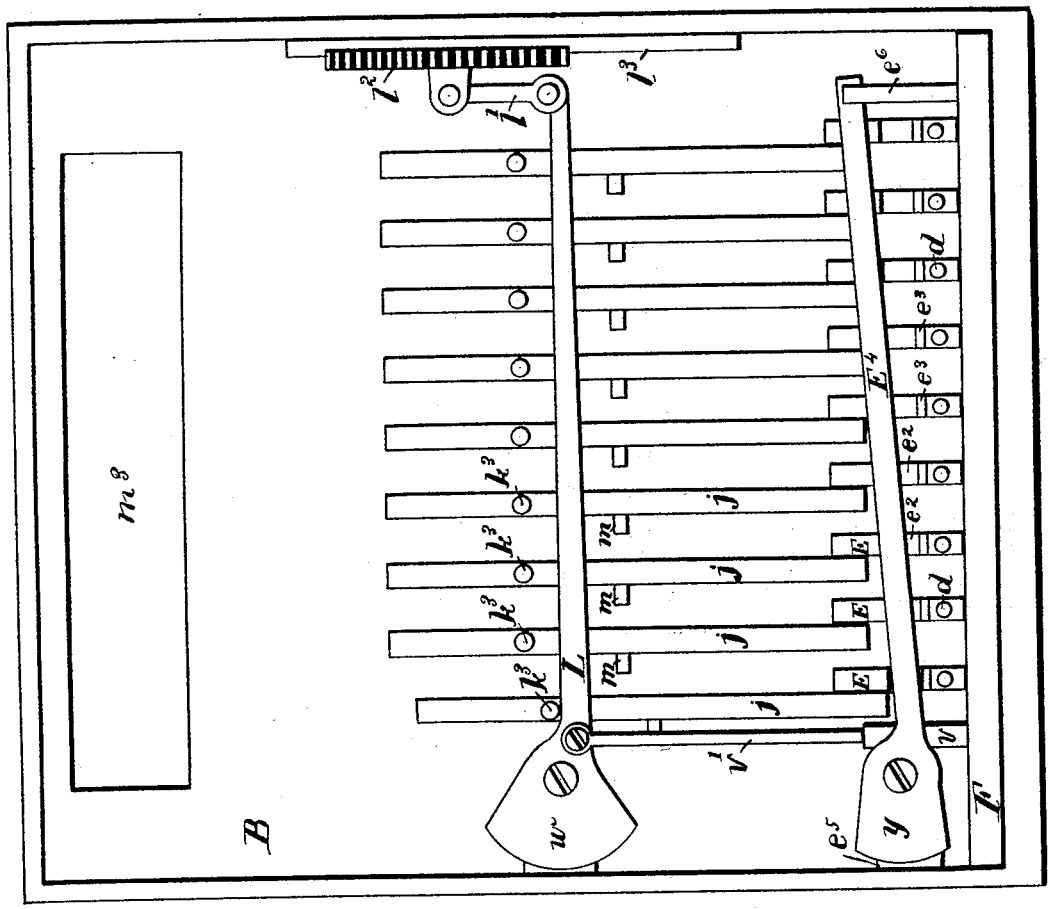

In the accompanying drawings forming a part of this specification, Figure 1 is a front elevation of a cash register, embodying my improvements, and adapted to register all amounts from one cent up to two thousand nine hundred and ninety nine, being provided with a series of nine units drawer pulls numbered from 1 to 9, a tens series numbered from 10 to 90, a hundreds series numbered from 1.00 to 9.00, and two knobs of a thousands series, numbered 10.00 and 20.00, exclusive of the knobs labeled "Change" and "Paid" in abbreviations, as shown. Fig. 2 is a transverse vertical section of the cash register, showing the cash drawer closed and locked. Fig. 3 is a similar section showing the cash drawer unlocked and a trip released. Fig. 4 is a similar section showing the cash drawer opened and a trip in operative engagement with the motive mechanism of the drawer. Fig. 5 is a part longitudinal vertical section taken on the line $x\,x$ Fig. 1, presenting the mechanism of the units series and a portion of the tens series in front elevation with the parts in the position shown in Fig. 2. Fig. 6 is a similar section with the parts in the position shown in Fig. 3. Fig. 7 is a similar section with the parts in the position shown in Fig. 4. Fig. 8 is a side elevation of the restoring mechanism for elevating the multiplying lever. Fig. 9 is a view of the multiplying lever, trips and operating cams. Fig. 10 is a view of an engaging head, cam, and a trip in released position. Fig. 11 is a view of the mechanism for preventing the manipulation of more than one drawer pull in a series at one registering operation of the cash drawer. Fig. 12 is a plan view of the trips, multiplying lever and the registering mechanism. Fig. 13 is a perspective view of the registering mechanism. Fig. 14 is an end view of the registering mechanism showing the reverse side of the primary registering wheel from that shown in Fig. 13, with the ratchet of the secondary registering wheel, and the mechanism for periodically engaging the rotating pawls and corresponding ratchets in normal position. Fig. 15 is a similar view showing said mechanism in position for resetting the registering wheels. Fig. 16 is a central longitudinal section through the registering wheels. Fig. 17 is a view of the means for insuring the initial lifting of trips preparatory to restoration by the operating cams, and the means for retaining the trips collectively in the elevated position while the drawer is in the open position. Figs. 18, 19, and 20 show the pivoted lifting cam in different positions relative to the pin or engaging shoulder of the lifting rod. Figs. 21 and 22 show the means for holding the shaft of the registering mechanism stationary.

Referring to the drawings, A designates the cash drawer, suitably arranged and fitted to slide in the case or inclosing frame B of the cash register. Exteriorly arranged on the front of the drawer, are the knobs or drawer pulls C, in banks or series representing units, tens, hundreds, and thousands, each series numbering nine knobs as far as complete, the highest series being incomplete and comprising two knobs only, whereby the machine will be adapted to register up to two thousand nine hundred and ninety nine; but it will be understood that the system may be extended indefinitely, and banks of knobs added up to any limit. The drawer pulls are mounted upon operating shanks or rods $d$ which are extended through the drawer beneath the till $p^2$, or cash receptacle proper of the drawer, and guided and adapted to a limited travel or free independent movement therein. Secured on the inner end of each rod or operating shank $d$ is a head E, which rests upon the rearwardly projecting base F of the drawer, and, in the aforesaid limited travel of the drawer pull and its rod $d$, is adapted to slide thereon. The drawer pull, rod $d$ and head E thus comprise a single operating part, which is normally held back or retained at the rearward limit of its travel, by a spiral spring $g$, which is coiled around the rod, and compressed into the space between the head E and the rear side of the cash drawer. The engaging heads E are arranged in groups or gangs conforming to the denominational series of drawer pulls, the case being divided into corresponding compartments by suitable vertical partitions $e'$. Each of the engaging heads has a notch or recess $e^2$ in its forward face, of rectangular shape having a portion of its lower side beveled downward to the face of the head to form a sloping surface or incline $e^3$ as shown. All the engaging heads of a gang or series are arranged in alignment transversely to the direction in which the cash drawer slides, and a horizontal locking bar $E^4$ is set directly in front of the gang of heads and notches $e^2$, being pivoted at one end to a mounting $e^5$ fastened to the side of the compartment. The lower edge of the bar is placed in the path of and adapted to be engaged by the inclines $e^3$ as the engaging heads are drawn forward by means of the drawer pulls, whereby in the manipulation of any drawer pull in the series the locking bar will be swung upward out of a horizontal plane and engaged with the rear or rectangular part of the notch $e^2$ pertaining to the incline $e^3$ by which the bar is elevated. In such position the bar will stand inclined to the plane of the base F and the row of notches in the engaging heads, thus preventing the simultaneous engagement of the bar by two or more notches, and withdrawal of more than one engaging head in each gang at any single opening of the cash drawer. This feature is essential in order to prevent the fraudulent substitution of numbers of lower denominations for those of a higher series in indicating sales, as for instance, by exhibiting the fourth and third indicator tablets of the units series to indicate a sale of forty three cents, when the fourth tablet of the tens series should be shown instead, though the indication is similar. A vertical guide $e^6$ having a shoulder $e^7$ is secured to the base F at the outer end of the locking bar to hold it in position. Directly forward and in the path of the heads E is a corresponding series of operating dogs or swing arms $i^2$ suspended from and fixed upon a shaft or arbor $i'$ arranged transversely of and extending entirely across the case, suitably journaled therein, and adapted to oscillate in the case or frame. A latch $i$ is secured upon the arbor $i'$ near one end thereof and adapted to swing with the motion of the arbor, and be operated by any of the engaging heads of all the series or gangs. The latch is adapted to engage a suitable hook H on the drawer, when the drawer is in closed position, thereby locking it shut. The weight of the latch and the operating dogs is alone sufficient to cause the interlocking of the latch and hook as the drawer is closed, and a suitable stop 31 should be provided to prevent the latch from dropping below its normal position whenever the hook is disengaged therefrom. The series or gangs of heads E normally support corresponding gangs of vertical rods or trips $j$, which are guided and adapted to slide freely in suitable transverse guide frames or bars $j'$ secured to the case. Each trip is provided with a horizontal pin or projection $k'$ which is adapted to rest on the flat upper surface of the head E, thus supporting the trip in the elevated position, the trips being arranged in vertical planes which lie immediately alongside of, or offset from the planes of the heads E. Secured upon the rearwardly projecting base F of the cash drawer are gangs of motive devices or operating cams $k^2$ corresponding to, and arranged just in the rear of, the heads E, and also in the sliding planes thereof, that is, each cam lies in the same plane as the projection $k'$ of the corresponding trip.

The operating flanges 32 of the cams are curved or inclined from a plane parallel to that in which the drawer moves, the front ends thereof being the highest, and arranged flush with the upper surfaces of the heads E, and with which they are normally in juxtaposition.

In the operation of the parts already described, the functions of the drawer pulls and their connections are to release or unlock the drawer, and trip or switch the aforesaid trips into operative engagement with the operating cams or motive mechanism of the drawer, the trips being provided with driving projections or shoulders $m$ on their sides adapted to operate the respective indicating devices, as hereinafter described, and driving pins or projections $k^3$ on their fronts or faces, adapted to engage and operate the registering levers L, of which one is provided for each gang of trips, arranged horizontally in front thereof, having one end pivoted upon a bracket $k^5$ secured to the case, and the other end connected by a suitable link $l'$ to a rack $l^2$ adapted to slide vertically on the guide $l^3$ on the case, and intermeshing with the pinion $l^4$ which drives the registering mechanism, as hereinafter described. If any particular draw pull is grasped and subjected to the strain of an outward pull as shown in Fig. 3, the spring $g$ will yield, and the rod $d$ and head E will travel forward in their bearings, the head E thereby being brought into engagement with the operating dog $i^2$, which movement raises and disengages the latch $i$ from the hook H, thus unlocking the drawer, which is then free to be opened by continued pulling upon the aforesaid knob or drawer pull. The said independent initial action of the drawer pull withdraws the head E from under the projection $k'$ of the corresponding trip, which thereupon immediately falls, the said projection dropping into the space thus created between the head E and the corresponding operating cam $k^2$. In such position the said projection prevents the return travel of the engaging head, thus holding all the other drawer pulls and engaging heads of the series immovable until after the opening of the drawer, as shown in Fig. 4. But as one engaging head may be withdrawn in each gang, therefore any desired combination of drawer pulls may be manipulated and the corresponding trips switched into operative relation with the cams, the tension of the springs $g$ being less than the force required to overcome the friction and inertia of the drawer, thus permitting the withdrawal of all the knobs of the combination, the last of which will pull the drawer open by the additional force ultimately exerted upon it.

The fall of the trip is regulated and limited by the positions of the projections $k^3$ and $m$ aforesaid, which are placed sufficiently above the levers or arms L and $m'$, assuming the trip in its highest position, to permit the trip to fall far enough to bring the projection or pin $k'$ into position for the leading or highest end of the flange of the operating cam to pass over it in the opening movement of the drawer. In such movement, all the trips previously switched into engagement with the cams will be depressed through a space corresponding to the amount of the incline of the curved flanges 32 from a line parallel to the movement of the drawer, as shown in Fig. 4 where the said cam is represented as having nearly passed over the projection $k'$, and the trip is at the bottom of its travel. Each trip in its downward motion will depress the corresponding lever L, by engagement of the projection $k^3$ therewith, and thus operate the registering mechanism as hereinafter described. As in each series the trips engage the lever at different distances from its fulcrum or pivotal point, the movement of the lever will vary accordingly, being greatest when actuated by the trip which is situated nearest to said fulcrum and least when actuated by the trip farthest therefrom. The trips should be arranged parallel and equidistant, and the space between the fulcrum of the lever L and the adjacent trip should equal the distance between the trips; the fulcrum and points of contact of the projections $k^3$ thus dividing the lever into nine equal spaces. Thus proportioned, the movement of the trip nearest the fulcrum will carry the lever through an arc of nine times the length of the arc through which it will be carried by the trip at the opposite end of the series and most remote from the fulcrum, and all the other trips of the gang will depress the lever in like proportion, as shown by the diagrammatic points 1, 2, 3, 4, 5, 6, 7, 8, 9, in Fig. 7. These spaces respectively correspond in length to the representative values or numbers of the drawer pulls in each denominational series, the drawer pulls of the units series being numbered 1, 2, 3, 4, 5, 6, 7, 8, 9, commencing with the trip pertaining to the outer end of the corresponding lever, the drawer pulls of the tens series being numbered 10, 20, 30, 40, 50, 60, 70, 80, 90, analogously to the first or units series, and so on throughout as many series as may be employed, the third series representing hundreds, the fourth thousands, proceeding in that order indefinitely.

The pinions $l^4$ intermeshing with the racks $l^2$, are loosely fitted on the arbor $l^5$ of the registering mechanism, which arbor extends the entire length of the machine through all the compartments thereof. Each pinion carries a pawl $l^6$ pivoted to the arm $l^7$ thereon, as shown in Figs. 12 and 13. The registering wheels $r', r^2, r^3, r^4, r^5$ are also loosely arranged on said arbor, separated by the friction washers S, which are keyed to the shaft along the spline S', therein, or otherwise fastened in a suitable manner to prevent their turning, while permitting their longitudinal movement on the shaft. The primary registering wheel $r'$ has a ratchet $r^{11}$ attached thereto, and adapted to be driven by the pawl $l^6$ which is kept in contact with the teeth of the ratchet by a suitably arranged spring $l^8$ acting between the arm $l^7$ and opposite end $l^9$ of the pawl. The ratchet is provided with ten teeth and the wheel $r'$ is correspondingly spaced into ten divisions bearing the numerals 0 to 9 inclusive. The pinion $l^4$ has twenty teeth, and is of such proportion that in the operation of the mechanism the movement of the lever L when actuated by the trip nearest the fulcrum thereof, will rotate the pinion through the space of one tenth of a revolution, and consequently an additional tenth of a revolution for each of the other trips in the gang, counting from the fulcrum, whereby the movement of the lever when actuated by the ninth trip of the series will rotate the pinion through nine tenths of a revolution, and correspondingly advance the registering wheel and its numbers to conform to the particular drawer pull manipulated. The secondary registering wheel of the series is also divided into ten spaces numbered precisely similar to the first, and is provided with a ten toothed ratchet $r^{12}$, driven by a pawl $l^{11}$ pivoted upon and carried by the primary wheel $r'$. Said pawl is normally kept out of contact with the ratchet by a spring 20 coiled around its hub with one end held by the pin 21, and the other acting outwardly against a projection 22 on the pawl. Once in each revolution of the primary wheel, said projection of the pawl $l^{11}$ moves under and is thrown inward by a stationary cam 23 external to the wheel as shown in Fig. 14, and the pawl is thereby engaged with the ratchet. The cam is so proportioned that by such engagement of the parts the ratchet will be carried through a tenth of a revolution, whereby the secondary registering wheel will be advanced one space, or number, for each revolution of the primary wheel. Said projection 22 enters a hole or cavity 24 in the wheel, which limits its outward motion when the pawl is not under the cam 23, as shown in Fig. 15. The driving mechanism of the remaining wheels of each series is similar to that for operating the secondary wheel, whereby each wheel of the series will be rotated through one tenth of a revolution for each entire revolution of the wheels next in order preceding, in conformity with the decimal system of notation, and the reading of the numbers of all the wheels of a series will correspond to the number of individual spaces passed over by the primary wheel. For instance, commencing with all the wheels of a series set at zero, then if the cash drawer be opened by means of drawer pull No. 3 in that series, the primary wheel will be turned through three spaces, and the numeral 3 will be brought up to the reading bar $r^{100}$. Then if the drawer be opened again, by the drawer pull No. 7 the primary wheel will be rotated through seven more spaces which will make an entire revolution, thus bringing the zero mark or cipher up to the reading bar, and advancing the secondary wheel through a single space, thereby exposing the numeral 1, at the left of the cipher of the primary wheel, and registering 10. In this manner the registration will continue up to any number, limited only by the number of wheels in a series.

If a single series of drawer pulls is employed, as in the case of a machine adapted to register sales of five cents and multiples thereof in this order up to one dollar or other given amount, the mechanism as described, will be "total adding" and the reading of the registering wheels will correctly express the sum of the sales. But a machine having several denominational series of drawer pulls, as shown in the drawings, will be "sectional adding," and it will be necessary to add the readings of the several sets of registering wheels to obtain the total of the sales. For instance, suppose a sale of forty two cents to have been made, followed by a sale of one dollar and sixty seven cents; starting with the registering mechanism of all the series of drawer pulls set at zero. To register the first amount, it will be necessary to pull the second drawer pull of the units series and the fourth drawer pull of the tens series, in opening the cash drawer, whereby the units registering mechanism will register 2 and the tens registering mechanism 4. Then in the next sale of one dollar and sixty seven cents, the seventh units knob, the sixth tens knob, and the first hundreds knob will be manipulated, thus adding seven to the units registering mechanism, six to the tens registering mechanism, and recording 1 on the hundreds registering mechanism. The units registering mechanism will then read, 09, the tens registering mechanism 1.0, and the hundreds registering mechanism 1., which when added, gives the total of two dollars and nine cents, which is the sum of forty-two and one hundred and sixty-seven. To hold the arbor $l^5$ stationary, one of the collars $s^3$ is formed with radial slots $s^4$ adapted to be engaged by the tooth $s^5$ of a pawl lever $s^6$, having the stop pins $s^7$ for engaging a hole $s^8$ in the case. The cams 23 are flat strips of sheet metal inserted between the registering wheels, and having their inner ends curved to the radius of the path of the projection 22 when the pawl $l^{11}$ is engaged with the ratchet $r^{12}$, one corner of said strip being beveled as shown to form an inclined surface 25 for camming the pawl into engagement with the ratchet, as the pawl rotates past it. The strips are fastened to bars 26, preferably by being bent into the form of U shaped loops and fitted in suitable parallel grooves 27, milled transversely of the bar, screws 35 being screwed through the bridges 36 of the loops into the outer face of the bar to hold them in place. The bars are secured on a rod 17 journaled longitudinally of the case and extending through all the compartments in bearings on the partitions and ends of the case. A spring lever 37 is provided for oscillating the rod to throw the cams 25 into or out of the path of the projection 22 respectively to insure the operation of the registering mechanism, or for resetting it at zero. Said lever is provided with a stop or pin 38 adapted to enter a suitable seat in the side of the case to hold the cams in the position for operating the registering mechanism as shown in Fig. 14. The lever is so arranged that when the cams are thrown out of contact position with the pawls, it will project outside the case, through the opening formed by raising the cover 40, as shown in Fig. 15. In such position the lower inner edges 38 of the bars are brought into juxtaposition with the peripheries of the registering wheels, and stops or projections 41 are provided thereon for engaging the bars to stop the wheels at zero, as shown in Fig. 15. Thus to reset the wheels at zero, it is only necessary to throw the lever 37 into the position shown in Fig. 15, and then turn the arbor $l^5$ ahead one revolution, which will bring all the stops 41 into contact with the edges 38 of the bars, as the said arbor extends through all the series of wheels, and carries the frictional washers S which are held in frictional contact with the wheels by springs $S^{10}$, adjusting nuts $S^2$, and collars $S^3$, on the arbor, a set for each series of wheels. Then by throwing the spring lever back to the position shown in Fig. 14 the wheels will be free to turn, and the cams will be brought into position to operate the registering mechanism. As the cover of the case cannot be closed without first throwing the lever back into its normal position the cams can never be left out of operative relation with the registering mechanism, the action of which will always be insured when the case is closed and locked.

For each trip there is an indicator tablet $m^2$, numbered to conform to the value of the corresponding drawer pull, and mounted upon a rod $n^2$ guided in the case and supported upon the levers $m'$ which are pivoted in gangs on the arbor $n^3$ in the case, the opposite ends of said lever being adapted to be engaged and operated by the projections $m$ on the trips, in the opening movement of the drawer, whereby the tablets are elevated into view through the sight apertures $m^3$ of the case. Each of the rods $n^2$ is provided with a detent shoulder $n$ adapted to be engaged and held in the raised position by a spring actuated holding pawl $n'$ extending transversely of the case, suspended from an arbor or pivot $n^3$. Said pawl is tripped at each opening movement of the drawer, by means of a catch $n^4$ carried on the cash drawer, whereby all the tablets previously exposed will be released and dropped out of view. The pawl also carries a hammer $p$, adapted in said movement thereof to strike a bell $p'$ in the case, thus announcing the action. The cavity or till $p^2$ in the cash drawer is set sufficiently back from the front edge of the case to prevent access thereto until in the movement of the drawer the cam $k^2$ has passed entirely over the pin $k'$ and thereby operated the registering, indicating and announcing mechanisms.

The improved means for insuring the initial lifting of the trips sufficiently to enable the operating cams to enter beneath the projection $k'$ in their restoration to normal position in the return movement of the drawer, comprises an elevating "bail" or horizontal bar $t$ hung in juxtaposition to the trips on the ends of suitable horizontal arms $t'$ pivoted to the case, and an independent pivoted inclined lifting cam $t^2$ and lifting rod $t^3$ arranged to act between the arm and bail, the trips having the engaging shoulders or projections $t^4$ adapted to be engaged by the elevating bail in said initial lifting action, and thereby raised sufficiently to bring the projection $k'$ above the level of the rear or lowest end of the operating cams. The said lifting rod $t^3$ is guided in the guides $j'$ similarly to the trips, and is provided with a pin $t^5$ for engaging the lifting cam, which is pivoted at its rear end to a supporting flange $f'$ on the base F and is set sufficiently in advance of the operating cams to pass under the pin $t^5$ and actuate the lifting rod before the operating cams reach the trips in the return of the drawer, whereby the rod and the lifting bail will be raised by the inclined upper surface of the cam, carrying the trips previously operated in the opening movement of the drawer. Then the trips having been raised to bring the projections $k'$ above the level of the rear end of the operating cams, said cams will enter beneath the projections and thereby elevate the trips to their normal position as the drawer closes. The cam is of such length that it will pass wholly by the pin $t^5$ in the return of the drawer, thus permitting the bail to drop to its lowest position when the drawer is closed, thereby falling out of the way of the projections $t^4$, to allow the initial depression of the trips in the succeeding opening movement of the drawer. In such position the pin $t^5$ will enter beneath the flange 18 of the cam on the opening movement of the drawer, but by being pivoted or hinged, the cam will swing upward to permit the pin to slide along it, thus offering no opposition to the movement of the drawer, which would be the case were the cam immovable. It is immaterial whether a single cam and bail be used for all the trips, or the mechanism be duplicated for each series of trips or section of the cash register. The lifting rod is provided with a projection $t^6$ for engaging the elevating bail to actuate it upward.

To retain the trips in their normal or elevated position during the opening movement of the cash drawer, excepting such as are tripped into operative engagement with the operating arms by the normal manipulation of the drawer pulls, I provide a holding bail $u$ or horizontal rod supported at the ends of vertical arms $u'$ pivoted in the case, the bail being adapted to be held against the trips by a weight, as $u^2$, or equivalent means, and the trips being provided with projections $u^3$ adapted to rest upon the said bail when it is in said position and the trips are elevated. The cash drawer is provided with a thrusting arm or spur $u^4$ of such length and in such position as to engage the holding bail, just before the drawer reaches its closed position, and thus push the bail away from the trips and out from under the said projections, $u^3$, whereby any of the trips will be free to drop when tripped by initial action of the drawer pulls, but as soon as the cash drawer and spur $u^4$ are moved outward a short distance, and before the engaging heads and high level parts of the operating cams have passed from under the untripped trips, the bail will be returned under the projections of such trips as have not fallen, thus holding them in the elevated position while the drawer is open, and the engaging heads and cams are removed from positions under them. The use of these devices for retaining the untripped trips in elevated position, and for instantly raising the tripped trips into position to be fully elevated by the operating cams dispenses with springs and secures the positive action of the parts, while enabling the drawer to be opened and closed without resistance or jumping motion, and with great ease, light pressure upon the drawer pulls, and smooth, uniform motion.

As the motion of the lever L when actuated by any of the trips $j$, requires to be independent of all the other trips of the series, it is necessary to provide separate lifting means for restoring the lever to its normal position after depression. This I accomplish by providing a special lifting cam V as shown in Figs. 5, 6 and 8 adapted to engage a connection or rod $v'$ which is connected to the lever L, whereby the lever will be raised as the cam passes under the connection in the closing movement of the drawer.

To facilitate the easy action of the lever it is preferably provided with a heavy end or weight $w$ adapted to counterbalance wholly or in part, the weight of the long arm of the lever and the link $l'$ and sliding rack $l^2$.

If desired the locking bar $E^4$ may be partly counterbalanced by a loaded end $y$, as shown in the figures.

I claim as my invention and desire to secure by Letters Patent—

1. In a cash register the combination of an inclosing case, a cash drawer therein, a series of exterior knobs or drawer pulls having operating shanks or rods guided and adapted to a limited independent movement in the drawer, means for locking the drawer in the case, comprising a fixed hook and a vibrating latch relatively mounted upon the drawer and case, a series of vibratory dogs or arms connected to swing conjointly with the latch, engaging heads for operating said dogs and the latch to release the drawer by initial movement of the drawer pulls, a series of trips normally supported by the said engaging heads, a series of operating cams for depressing said trips in the forward movement of the drawer and elevating them on the return travel thereof, as determined by the initial manipulation of the drawer pulls, a registering lever adapted to be operatively engaged by said trips and actuated through arcs or distances respectively corresponding to the numbers or representative values of the corresponding drawer pulls, and registering mechanism connected with and adapted to be operated by said lever, whereby the registration effected by the respective trips and their operating mechanism is aggregated mechanically, substantially as specified.

2. In a cash register the combination of an inclosing case, a cash drawer therein, a series of exterior knobs or drawer pulls having operating shanks or rods guided and adapted to a limited independent movement in the drawer, means for locking the drawer in the case, comprising a fixed hook and a vibrating latch relatively mounted upon the drawer and case, a series of vibratory dogs or arms connected to swing conjointly with the latch, engaging heads for operating said dogs and the latch to release the drawer by initial movement of the drawer pulls, a series of trips normally supported by the said engaging heads, a series of operating cams for depressing said trips in the forward movement of the drawer and elevating them on the return travel thereof, as determined by the initial manipulation of the drawer pulls, a registering lever pivoted to swing in a plane substantially parallel to the plane of the trips, projections or driving shoulders carried by the trips and adapted to actuate the lever through arcs or distances corresponding respectively to the numbers or representative values of the corresponding drawer pulls, and registering mechanism connected with and adapted to be operated by said lever, whereby the registration of the various trips of the series is rendered total adding, substantially as described.

3. In a cash register the combination with the registering wheels and their actuating pawls and ratchets, of an inclosing case, a lever fulcrumed or pivoted therein, operating connections for transmitting the motion of the lever to the registering mechanism, a cash drawer, a series of exterior knobs or drawer pulls having operating shanks or rods guided and adapted to a limited independent movement in the drawer and provided with engaging heads, a hook carried upon the cash drawer, springs for retaining the knobs, shanks, and engaging heads at the rearward limit of their travel, a latch adapted to engage therewith to lock the drawer in closed position, a series of operating dogs connected to vibrate conjointly with the latch by initial action of the drawer pulls, a series of operating cams mounted on the cash drawer corresponding to the drawer pulls, a series of trips guided and adapted to a limited reciprocating movement in the case normally supported by the engaging heads and adapted through release by the initial action of the drawer pulls, to be tripped or switched into operative engagement with the cams, said trips being arranged along the lever at distances from the fulcrum corresponding inversely to the numbers or representative values of the corresponding drawer pulls, and provided with shoulders or projections for engaging and actuating the lever by the movement of the drawer, and through spaces corresponding to the value or number of the drawer pull manipulated, thereby rendering the mechanism total adding, substantially as specified.

4. In a cash register the combination with the registering wheels and their actuating pawls and ratchets, of an inclosing case, a lever fulcrumed or pivoted therein, operating connections for transmitting the motion of the lever to the registering mechanism, a cash drawer, a series of exterior knobs or drawer pulls having operating shanks or rods guided and adapted to a limited independent movement in the drawer and provided with engaging heads, a hook carried upon the cash drawer, springs for retaining the knobs, shanks, and engaging heads at the rearward limit of their travel, a latch adapted to engage therewith to lock the drawer in closed position, a series of operating dogs connected to vibrate conjointly with the latch by initial action of the drawer pulls, a series of operating cams mounted on the cash drawer corresponding to the drawer pulls, a series of trips guided and adapted to a limited reciprocating movement in the case normally supported by the engaging heads and adapted through release by the initial action of the drawer pulls, to be tripped or switched into operative engagement with the cams, said trips being arranged parallel and equidistant in a plane parallel with the swinging plane of the lever, and provided with driving projections for engaging and operating the lever by the motion of the cash drawer, the corresponding drawer pulls of the respective trips representing values in arithmetical progression, and the highest trip in the series being placed at a distance from the fulcrum of the lever corresponding to the distance of the trips apart, substantially as and for the purpose specified.

5. In a total adding cash register, the combination of an inclosing case, a cash drawer, a locking hook thereon, a latch for engaging the locking hook and a series of operating dogs or arms connected with the latch, a series of movable knobs or handles and their rods or operating shanks, guided in the drawer, engaging heads thereon having their planes of motion coincident with the vibrating paths of the said operating dogs; a lever, fulcrumed or pivoted in the case, a rack, guided in the case and connected with said lever, a pinion intermeshing with said rack, the registering wheels, pawl and ratchet motion for operating the primary registering wheel by said pinion, pawl and ratchet mechanism for periodically operating each of the remaining registering wheels by the motion of the wheel next preceding, a series of cams or motive mechanism carried by the cash drawer and corresponding to the drawer pulls, and a series of trips adapted to be operatively connected with the said cams and the lever by the initial action of the drawer pulls, said trips being arranged to act upon the lever at distances from its fulcrum or center corresponding inversely to the numbers or representative values of the corresponding drawer pulls, and means for restoring the lever to its normal position after registration, substantially as and for the purpose specified.

6. In a cash register the combination with the registering wheels and their actuating pawls and ratchets, of an inclosing case, a lever fulcrumed or pivoted therein, operating connections for transmitting the motion of the lever to the registering mechanism, a cash drawer, a series of exterior knobs or drawer pulls having operating shanks or rods guided and adapted to a limited independent movement in the drawer and provided with engaging heads, a hook carried upon the cash drawer, springs for retaining the knobs, shanks, and engaging heads at the rearward limit of their travel, a latch adapted to engage therewith to lock the drawer in closed position, a series of operating dogs connected to vibrate conjointly with the latch by initial action of the drawer pulls, a series of operating cams mounted on the cash drawer corresponding to the drawer pulls, a series of trips guided and adapted to a limited reciprocating movement in the case normally supported by the engaging heads and adapted through release by the initial action of the drawer pulls, to be tripped or switched into operative engagement with the cams, said trips being arranged along the lever at distances from the fulcrum corresponding inversely to the numbers or representative values of the corresponding drawer pulls, and provided with shoulders or projections for engaging and actuating the lever by the movement of the drawer, and through spaces corresponding to the value or number of the drawer pull manipulated, thereby rendering the mechanism total adding, and an elevating cam and connections for restoring the lever to the normal position after registration, by the return movement of the cash drawer, substantially as specified.

7. In a cash register the combination with the registering wheels and their actuating pawls and ratchets, of an inclosing case, a lever, fulcrumed or pivoted therein, operating connections for transmitting the motion of the lever to the registering mechanism, a cash drawer, a series of exterior knobs or drawer pulls having operating shanks or rods guided and adapted to a limited independent movement in the drawer and provided with engaging heads, a hook carried upon the cash drawer, springs for retaining the knobs, shanks, and engaging heads at the rearward limit of their travel, a latch adapted to engage therewith to lock the drawer in closed position, a series of operating dogs connected to vibrate conjointly with the latch by initial action of the drawer pulls, a series of operating cams mounted on the cash drawer corresponding to the drawer pulls, a series of trips guided and adapted to a limited reciprocating movement in the case normally supported by the engaging heads and adapted through release by the initial action of the drawer pulls, to be tripped or switched into operative engagement with the cams, said trips being arranged parallel and equidistant in a plane parallel with the swinging plane of the lever, and provided with driving projections for engaging and operating the lever by the motion of the cash drawer, the corresponding drawer pulls of the respective trips representing values in arithmetical progression, and the highest trip in the series being placed at a distance from the fulcrum of the lever corresponding to the distance of the trips apart, and means for elevating or restoring the lever to the normal or elevated position after registration, substantially as and for the purpose specified.

8. In registering mechanism the combination of a series of registering wheels, suitable pawls and ratchets carried by the wheels, each ratchet adapted to be periodically actuated by the pawl of the wheel next preceding in the series, an oscillating cam bar hinged or pivoted eccentric to the wheels, a series of cams carried by said bar and adapted by oscillation thereof to be projected into or out of the paths of the pawls to engage the pawls with their ratchets in the normal rotation thereof, or permit their uninterrupted revolution in resetting the wheels at zero, substantially as specified.

9. In registering mechanism the combination of a series of registering wheels, suitable pawls and ratchets carried by the wheels, each ratchet adapted to be periodically actuated by the pawl of the wheel next preceding in the series, an oscillating cam bar hinged or pivoted eccentric to the wheels, a series of cams carried by said bar and adapted by oscillation thereof to be projected into or out of the paths of the pawls to engage the pawls with their ratchets in the normal rotation thereof, or permit their uninterrupted revolution in resetting the wheels at zero, the said oscillating bar having an edge or abutment on the side of the fulcrum opposite the said cams adapted to be swung into juxtaposition with the periphery of the registering wheels as the cams are swung out of the path of the pawls, and the wheels being provided with resetting stops or projections adapted to be intercepted by the said abutment to stop the wheels at zero, substantially as specified.

10. In registering mechanism the combination of a series of registering wheels, suitable pawls and ratchets carried by the wheels, each ratchet adapted to be periodically actuated by the pawl of the wheel next preceding in the series, an oscillating cam bar hinged or pivoted eccentric to the wheels, a series of cams carried by said bar and adapted by oscillation thereof, to be projected into or out of the paths of the pawls to engage the pawls with their ratchets in the normal rotation thereof, or permit their uninterrupted revolution in resetting the wheels at zero, the said oscillating bar having an edge or abutment on the side of the fulcrum opposite the said cams adapted to be swung into juxtaposition with the periphery of the registering wheels as the cams are swung out of the path of the pawls, and the wheels being provided with resetting stops or projections adapted to be intercepted by the said abutment to stop the wheels at zero, and the bar being provided with a handle adapted to project out of the inclosing case of the mechanism through the opening formed by removal of the cover, when swung into the position for resetting the registering wheels at zero, whereby the restoration of the parts to working position will be insured by the act of closing the case, substantially as and for the purpose specified.

11. In registering mechanism the combination of a series of registering wheels, suitable pawls and ratchets carried by the wheels, each ratchet adapted to be periodically actuated by the pawl of the wheel next preceding in the series, an oscillating cam bar hinged or pivoted eccentric to the wheels, a series of cams comprising looped or U shaped strips inserted in parallel transverse notches milled in the edge of the bar, each loop forming two cams and being secured to the bar by a screw through the back or bridge portion of the loop, and the ends of said strips being suitably beveled or inclined and adapted by projection into the paths of the pawls by oscillation of the bar to engage the pawls in their revolution and actuate them into engagement with the corresponding ratchets to periodically actuate each wheel by the rotation of the wheel next preceding in the series, substantially as and for the purpose specified.

12. In a cash register the combination of an inclosing case, a cash drawer therein, a series of exterior knobs or drawer pulls having operating shanks or rods guided and adapted to a limited independent movement in the drawer, locking means for securing the drawer in the case, comprising a fixed hook, a vibrating latch relatively mounted upon the drawer and the case, and a series of vibratory dogs or arms connected to swing conjointly with the latch, a series of engaging heads corresponding to and adapted to actuate the dogs by initial action of the drawer pulls, each provided with a slot or recess having one side beveled or inclined to its plane of motion to form a cam surface, and a locking bar or lever pivoted and arranged in juxtaposition to the faces of said engaging heads and in the paths of the inclined cam surfaces thereof, thereby being adapted by withdrawal of any individual engaging head in the initial action of a drawer pull, to be cammed or swung into engagement with the slot or recess thereof, and oblique to or out of alignment with the remaining slots of the series, whereby the action of one of the engaging heads will lock or bar the movement of all the other drawer pulls of the series, substantially as and for the purpose specified.

13. In a cash register the combination of an inclosing case, a cash drawer therein, a series of exterior knobs or drawer pulls having operating shanks or rods guided and adapted to a limited independent movement in the drawer, locking means for securing the drawer in the case, comprising a fixed hook, a vibrating latch relatively mounted upon the drawer and the case, and a series of vibratory dogs or arms connected to swing conjointly with the latch, a series of engaging heads corresponding to and adapted to actuate the dogs by initial action of the drawer pulls, each provided with a rectangular slot or recess in its front face having the lower front edge thereof beveled or inclined to the plane of motion of the engaging head and forming a cam surface thereon, and a locking bar or lever adapted to fit and be received in the said slots and pivoted or hinged to swing in juxtaposition to the faces of the engaging heads, normally arranged in the plane of said inclined cams, whereby in the withdrawal of an engaging head by initial action of the corresponding drawer pull, the lever will be engaged with the slot of the head and thrown out of alignment with the remaining slots of the series to bar or intercept the engaging heads, substantially as and for the purpose specified.

14. In a cash register the combination of an inclosing case, a cash drawer therein, a series of exterior knobs or drawer pulls, having operating shanks or rods guided and adapted to a limited independent movement in the drawer, locking means for securing the drawer in the case, comprising a fixed hook, a vibrating latch relatively mounted upon the drawer and the case, and a series of vibratory dogs or arms connected to swing conjointly with the latch, a series of engaging heads corresponding to and adapted to actuate the dogs by initial action of the drawer pulls, each provided with a rectangular slot or recess in its front face having the lower front edge thereof beveled or inclined to the plane of motion of the engaging head and forming a cam surface thereon, and a locking bar or lever adapted to fit and be received in the said slots and pivoted or hinged to swing in juxtaposition to the faces of the engaging heads, normally arranged in the plane of said inclined cams, whereby in the withdrawal of an engaging head by initial action of the corresponding drawer pull, the lever will be engaged with the slot of the head and thrown out of alignment with the remaining slots of the series to bar or intercept the engaging heads, a series of operating cams or motive mechanisms carried by the cash drawer, and a series of trip mechanisms corresponding to the drawer pulls and adapted to operatively connect the registering and indicating mechanisms, with the motive mechanism by the initial independent action of the drawer pulls, substantially as specified.

15. In a sectional adding cash register, the combination of the series of movable knobs or handles and their rods or operating shanks guided in the drawer, engaging heads thereon, each provided with a slot or recess having one side beveled or inclined to its plane of motion to form a cam surface, and a locking bar or lever pivoted and arranged in juxtaposition to the faces of said engaging heads and in the paths of the inclined cam surfaces thereof, thereby being adapted by withdrawal of any individual engaging head in the initial action of a drawer pull, to be cammed or swung into engagement with the slot or recess thereof, and oblique to or out of alignment with the remaining slots of the series, whereby the action of one of the engaging heads will lock or bar the movement of all the other drawer pulls of the series, substantially as and for the purpose specified.

16. In a cash register the combination of an inclosing case, a cash drawer therein, a series of exterior knobs or drawer pulls having operating shanks or rods guided and adapted to a limited independent movement in the drawer, locking means for securing the drawer in the case, comprising a fixed hook, a vibrating latch relatively mounted upon the drawer and the case, and a series of vibratory dogs or arms connected to swing conjointly with the latch, a series of engaging heads corresponding to and adapted to actuate the dogs by initial action of the drawer pulls, each provided with a slot or recess having one side beveled or inclined to its plane of motion to form a cam surface, and a locking bar or lever pivoted and arranged in juxtaposition to the faces of said engaging heads and in the paths of the inclined cam surfaces thereof, thereby being adapted by withdrawal of any individual engaging head in the initial action of a drawer pull, to be cammed or swung into engagement with the slot or recess thereof, and oblique to or out of alignment with the remaining slots of the series, whereby the action of one of the engaging heads will lock or bar the movement of all the other drawer pulls of the series, a series of operating cams mounted on the cash drawer corresponding to the drawer pulls, springs for retaining the knobs, shanks and engaging heads at the rearward limit of their travel, and a series of trips guided in the case normally supported by the said engaging heads, and adapted when tripped into position for operative engagement with the operating cams by withdrawal of an engaging head, to bolt or chock the head against return movement except by the opening movement of the drawer, substantially as and for the purpose specified.

17. In a cash register, the combination with an inclosing case, of a cash drawer, a locking hook thereon, a pawl for engaging the locking hook and a series of operating dogs or arms connected with the pawl, a series of movable knobs or handles and their rods or operating shanks guided in the drawer, engaging heads thereon having their planes of motion coincident with the vibrating paths of the said operating dogs, springs for retaining the knobs, shanks and engaging heads at the rearward limit of their travel, a series of trips guided in the case normally supported by the said engaging heads, a series of operating cams for depressing said trips in the forward movement of the drawer and elevating them on the return travel thereof, a holding bail or support hinged or guided to swing horizontally toward and into juxtaposition to the series of trips, said trips being provided with holding shoulders or projections for engaging the bail to hold the trips in elevated position, a weight or yielding means for automatically holding the bail against the trips, and engaging means carried by the cash drawer and adapted to hold the bail free of the trips and their holding projections when the drawer is in closed position, and permit their engagement in the opening movement of the drawer, substantially in the manner and for the purpose specified.

18. In a cash register having a series of operating knobs or drawer pulls guided in the drawer, registering and indicating mechanism, motive mechanism carried by the drawer, and tripping mechanism for switching the motive, registering and indicating mechanism into operative connection, the combination with the series of trips, of the holding shoulders or projections thereon, a holding bail or support hinged or guided in the case and adapted to engage and support the said holding shoulders to retain the trips in elevated position, means for actuating the bail into the moving plane of the holding shoulders, and a thrust bar or engaging means carried by the cash drawer and adapted to release the bail free of the trips and their holding projections in the closing movement of the drawer, to permit the fall of any required combination of the trips and their operation by the motive mechanism, in the normal manipulation of the drawer pulls, substantially as and for the purpose specified.

19. In a cash register, the combination of an inclosing case, a cash drawer therein, a series of exterior knobs or drawer pulls having operating shanks or rods guided and adapted to a limited independent movement in the drawer, means for locking the drawer in the case, comprising a fixed hook and a vibrating latch relatively mounted upon the drawer and case, a series of vibratory dogs or arms connected to swing conjointly with the latch, engaging means for operating said dogs and the latch to release the drawer, by initial movement of the drawer pulls, springs for retaining the knobs, shanks, and engaging heads at the rearward limit of their travel, a series of trips guided in the case normally supported by the said engaging heads, a series of operating cams for depressing said trips in the forward movement of the drawer and elevating them on the return travel thereof, registering and indicating mechanism operatively connected with said trips, and the initial lifting means for raising the trips to and within the acting plane of the elevating incline of the operating cams, substantially as and for the purpose specified.

20. In a cash register the combination of an inclosing case, a cash drawer therein, a series of exterior knobs or drawer pulls having operating shanks or rods guided and adapted to a limited independent movement of the drawer, means for locking the drawer in the case, comprising a fixed hook and a vibrating latch relatively mounted upon the drawer and case, a series of vibratory dogs or arms connected to swing conjointly with the latch, engaging means for operating said dogs and the latch to release the drawer, by initial movement of the drawer pulls, springs for retaining the knobs, shanks, and engaging heads at the rearward limit of their travel, a series of trips guided in the case normally supported by the said engaging heads, a series of operating cams for depressing said trips in the forward movement of the drawer and elevating them on the return travel thereof, registering and indicating mechanism operatively connected with said trips, an elevating bail or movable bar arranged in juxtaposition to the trips, lifting projections or shoulders on the trips adapted to be engaged by said bail to lift the trips, a lifting rod operatively connected to the said bail, and a lifting cam carried by the cash drawer and adapted to elevate the trips through that part of their travel wherein the cam pins $k'$ thereof are below and out of the plane of action of the lifting inclines of the cams, substantially as and for the purpose specified.

21. In a cash drawer, the combination with the movable trips $j$, their operating cams $k^2$, and the engaging heads for supporting the trips of the elevating bail $t$, connection $t^3$, and the pivoted lifting cam $t^2$ for raising the trips to and within the acting plane of the elevating inclines of the operating cams, substantially in the manner and for the purpose specified.

22. In a cash register the combination of an inclosing case, a cash drawer therein, a series of exterior knobs or drawer pulls having operating shanks or rods guided and adapted to a limited independent movement in the drawer and provided with engaging heads, locking means for securing the drawer in the case, comprising a fixed hook, a vibrating latch relatively mounted upon the drawer and the case, a series of vibratory dogs or arms corresponding to the engaging heads and connected to swing conjointly with the latch by initial action of the drawer pulls, a series of operating cams mounted on the cash drawer corresponding to the drawer pulls, guide frames or bars mounted in the case, a series of trips guided in the said frames and adapted to reciprocating movement therein by engagement with the cams, means for tripping or switching the trips into operative engagement with the cams by initial action of the drawer pulls, a series of indicator tablets corresponding to the drawer pulls, arms or connections for supporting the tablets, pins or shoulders carried on the trips and adapted to engage said connections to actuate the tablets into exposed position, holding mechanism for sustaining the tablets in exposed position, registering mechanism adapted to be operated by the said trips and cams by the movement of the cash drawer, an elevating bail or movable bar arranged in juxtaposition to the trips, lifting projections or shoulders on the trips adapted to be engaged by said bail to lift the trips, a lifting cam carried by the cash drawer, and a connection for elevating the said bail by said cam, to and within the acting plane of the elevating incline of the operating cams, substantially as and for the purpose specified.

23. In a cash register the combination of an inclosing case, a cash drawer therein, a series of exterior knobs or drawer pulls having operating shanks or rods guided and adapted to a limited independent movement in the drawer and provided with engaging heads, locking means for securing the drawer in the case, comprising a fixed hook, a vibrating latch relatively mounted upon the drawer and the case, a series of vibratory dogs or arms, corresponding to the engaging heads and connected to swing conjointly with the latch by initial action of the drawer pulls, a series of operating cams mounted on the cash drawer corresponding to the drawer pulls, guide frames or bars mounted in the case, a series of trips guided in the said frames and adapted to reciprocating movement therein by engagement with the cams, means for tripping or switching the trips into operative engagement with the cams by initial action of the drawer pulls, a series of indicator tablets corresponding to the drawer pulls, arms or connections for supporting the tablets, pins or shoulders carried on the trips and adapted to engage said connections to actuate the tablets into exposed position, holding mechanism for sustaining the tablets in exposed position, registering mechanism adapted to be operated by the said trips and cams by the movement of the cash drawer, an elevating bail or movable bar arranged in juxtaposition to the trips, lifting projections or shoulders on the trips adapted to be engaged by said bail to lift the trips, a lifting cam carried by the cash drawer, and a connection for elevating the said bail by said cam, to and within the acting plane of the elevating incline of the operating cams, a holding bail or support hinged or guided to swing into juxtaposition to the series of trips, said trips being provided with holding shoulders or projections for engaging the bail to hold the trips in elevated position, a weight or yielding means for automatically holding the bail against the trips, and engaging means carried by the drawer and adapted to hold the bail free of the trips and their holding projections when the drawer is in closed position, and to permit their engagement in the opening movement of the drawer.

24. In a cash register the combination of an inclosing case, a series of exterior knobs or drawer pulls having operating shanks or rods guided and adapted to a limited independent movement in the drawer and provided with engaging heads, springs for retracting the drawer pulls and connections, a hook carried upon the drawer, an arbor journaled in the case and provided with a latch for engaging said hook to lock the drawer in closed position, a series of operating dogs mounted upon said arbor in the paths of the engaging heads, for releasing the latch by initial movement of the drawer pulls, a series of operating cams mounted on the cash drawer, corresponding to the drawer pulls, a series of movable trips guided in the case normally supported by the engaging heads and adapted through release by the initial movement thereof to be tripped or switched into operative engagement with the operating cams, a series of indicator tablets corresponding to the drawer pulls, a series of levers for supporting the tablets, arranged in operative connection or engagement with the trips, a series of holding hooks or latches, and retaining studs for securing the indicator tablets in exposed position, the release mechanism for disengaging the same, a registering lever operated by the said trips, registering mechanism connected with and operated by said lever, the elevating bail $t$, holding shoulders $t^4$, the pivoted elevating cam $t^2$, lifting rod $t^3$ and projections $t^5$ and $t^6$, the holding bail $u$, projections $u^3$ on the trips, and the thrust bar $u^4$ carried by the drawer, all arranged substantially in the manner and for the purpose specified.

25. In a cash register the combination of an inclosing case, a cash drawer therein, denominational sets or series of exterior knobs or drawer pulls having operating shanks or rods guided and adapted to a limited independent movement in the drawer and provided with engaging heads, springs for retracting the drawer pulls and connections, a hook carried upon the cash drawer, a latch adapted to engage therewith to lock the drawer in closed position, series of operating dogs connected to vibrate conjointly with the latch by initial action of the drawer pulls, series of operating cams mounted on the cash drawer corresponding to the drawer pulls, series of trips guided and adapted to a limited reciprocating movement or travel in the case normally supported by said engaging heads and adapted through release by the initial action of the drawer pulls to be tripped or switched into operative engagement with the cams, series of indicator tablets corresponding to the drawer pulls, series of independent levers supporting the tablets, actuating pins or shoulders carried by the trips and adapted to engage the said levers to actuate the tablets into exposed position, holding mechanism comprising series of hooks and studs for retaining the tablets in exposed position, a weight for swinging the same into engagement, a release lever connected with the holding mechanism, and a releasing latch carried on the drawer and adapted to release the holding mechanism and exposed tablets by the action of the drawer, a registering lever for each denominational series of trips adapted to be operated by the respective trips of the series through arcs corresponding to the representative value of the corresponding drawer pulls, the independent registering mechanism for each lever, means substantially as described for resetting the several registering mechanisms at zero, locking means substantially as described for locking the engaging heads of each series by operation of any individual drawer pull or engaging head of a series, a holding bail or support hinged or guided in the case and adapted to engage and support the trips in elevated position, means for engaging the bail with the trips, engaging means carried by the cash drawer and adapted to release the bail from the trips in the closing movement of the drawer, and the initial means for raising the trips to and within the acting plane of the elevating incline of the operating cams, substantially in the manner and for the purpose specified.

THOMAS CARROLL.

Witnesses:
CHARLES E. CARROLL,
JOHN W. STEVENSON.